US012670436B2

(12) United States Patent
Charania et al.

(10) Patent No.: US 12,670,436 B2
(45) Date of Patent: Jun. 30, 2026

(54) SYSTEMS AND METHODS FOR PREDICTING DIFFERENTIATING FEATURES

(71) Applicant: Capital One Services, LLC, McLean, VA (US)

(72) Inventors: Aamer Charania, Flower Mound, TX (US); Abhisek Jana, Herndon, VA (US); Jiankun Liu, Flower Mound, TX (US); Behrouz Saghafi Khadem, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 944 days.

(21) Appl. No.: 17/957,127

(22) Filed: Sep. 30, 2022

(65) Prior Publication Data

US 2024/0112075 A1     Apr. 4, 2024

(51) Int. Cl.
| | |
|---|---|
| *G06F 7/00* | (2006.01) |
| *G06F 16/00* | (2019.01) |
| *G06F 18/2137* | (2023.01) |
| *G06N 20/00* | (2019.01) |

(52) U.S. Cl.
CPC ....... *G06N 20/00* (2019.01); *G06F 18/21375* (2023.01)

(58) Field of Classification Search
None
See application file for complete search history.

(56) References Cited

U.S. PATENT DOCUMENTS

| | | | |
|---|---|---|---|
| 2021/0264244 A1* | 8/2021 | Xian | G06F 16/9024 |
| 2022/0405619 A1* | 12/2022 | Ramamurthy | G06F 16/9024 |
| 2024/0378247 A1* | 11/2024 | Kelly | G06F 16/355 |

* cited by examiner

*Primary Examiner* — Tuan A Pham
(74) *Attorney, Agent, or Firm* — Foley & Lardner LLP

(57) ABSTRACT

Systems and methods for predicting differentiating features from tabular data for two different populations. In some aspects, the systems and methods provide for receiving first data entries and second data entries and generating a first graph based on a data entry from the first data entries and a second graph based on a data entry from the second data entries. A first node in the first graph is determined to correspond to a second node in the second graph. A first set of graph embeddings is generated based on the first graph. A second set of graph embeddings is generated based on the second graph. Using a machine learning model, the first set of graph embeddings and the second set of graph embeddings are processed to identify at least one feature indicative of a difference between the first data entries and the second data entries.

21 Claims, 5 Drawing Sheets

250

200

*Population 1*

*Population 2*

400

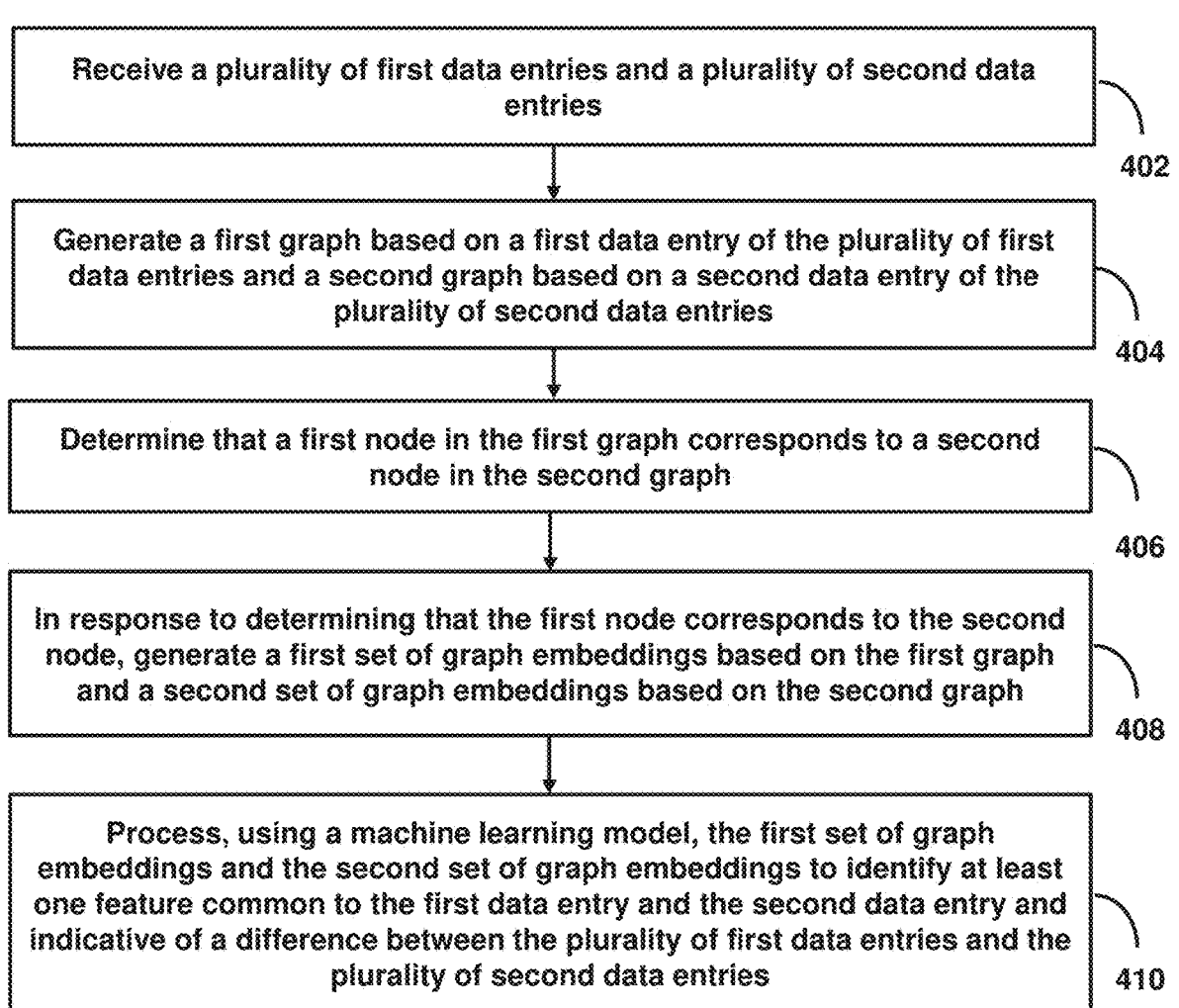

Receive a plurality of first data entries and a plurality of second data entries

402

Generate a first graph based on a first data entry of the plurality of first data entries and a second graph based on a second data entry of the plurality of second data entries

404

Determine that a first node in the first graph corresponds to a second node in the second graph

406

In response to determining that the first node corresponds to the second node, generate a first set of graph embeddings based on the first graph and a second set of graph embeddings based on the second graph

408

Process, using a machine learning model, the first set of graph embeddings and the second set of graph embeddings to identify at least one feature common to the first data entry and the second data entry and indicative of a difference between the plurality of first data entries and the plurality of second data entries

SYSTEMS AND METHODS FOR PREDICTING DIFFERENTIATING FEATURES

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical problems present an inherent problem with attempting to use an artificial intelligence-based solution in predicting from tabular data one or more features driving the differences between data from two different populations.

SUMMARY

Methods and systems are described herein for novel uses and/or improvements to artificial intelligence applications for predicting one or more features driving the differences between data from two different populations. As one example, methods and systems are described herein for a graph-based approach to accurately predict from tabular data one or more features indicative of a difference between data from two populations. In some embodiments, the graph-based approach analyzes differences between the tabular data from the two different populations (e.g., the same population at two different periods of time, populations to two different geographical locations, etc.) using time stamped graphs generated based on data entries from the tabular data.

Tabular data in such circumstances is typically sparse and includes few samples available for training. For example, the tabular data may include information regarding certain types of operations but may include very few instances of operations for a particular system. Conventional systems for analyzing tabular data to predict such features looked at each row or data entry in the tabular data independently, while the graph-based approach described herein leverages relationships across rows or data entries to predict relevant features. Further, the difficulty in adapting artificial intelligence models for this practical benefit faces several technical challenges such as sparsity in the tabular data, paucity of samples available for training, and inability to create feature inputs representative of the technical problem to be addressed, resulting in conventional systems lacking accuracy.

To overcome these technical deficiencies in adapting artificial intelligence models for this practical benefit, methods and systems disclosed herein provide for a graph-based approach that analyzes differences between tabular data from the two different populations (e.g., the same population at two different periods of time, populations to two different geographical locations, etc.) using time stamped graphs generated based on data entries from the tabular data. In particular, the time stamped graphs for each data entry capture a snapshot of events for an associated time stamp but are independent of any events before or after the associated time stamp. The graph-based approach converts the tabular data from both populations into time stamped graphs, determines corresponding nodes in the graphs, generates graph embeddings based on the graphs, and processes the graph embeddings using a machine learning model to predict one or more features indicative of the difference between the two populations. Accordingly, the methods and systems provide a graph-based approach to accurately predict from tabular data one or more features indicative of a difference between data from two populations.

In some aspects, a system for predicting one or more features indicative of a difference between a first population and a second population includes one or more processors and a non-transitory, computer-readable medium comprising instructions that, when executed by the one or more processors, cause operations. The operations include receiving in tabular form a plurality of first data entries for a first population and a plurality of second data entries for a second population. A first data entry of the plurality of first data entries includes first values for one or more features. A second data entry of the plurality of second data entries comprises second values for the one or more features. The operations further include generating a first graph based on the first data entry and a second graph based on the second data entry. The first graph is independent of any events before or after a first time stamp. The second graph is independent of any events before or after a second time stamp. The operations further include determining that a first node in the first graph associated with the first time stamp corresponds to a second node in the second graph associated with the second time stamp. The operations further include, in response to determining that the first node corresponds to the second node, generating a first set of graph embeddings based on the first graph and a second set of graph embeddings based on the second graph. The operations further include processing, using a machine learning model, the first set of graph embeddings and the second set of graph embeddings to identify, from the one or more features, at least one feature with a probability satisfying a threshold to be indicative of a difference between the first population and the second population.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification. "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in predicting from tabular data one or more features indicative of a difference between two different populations, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
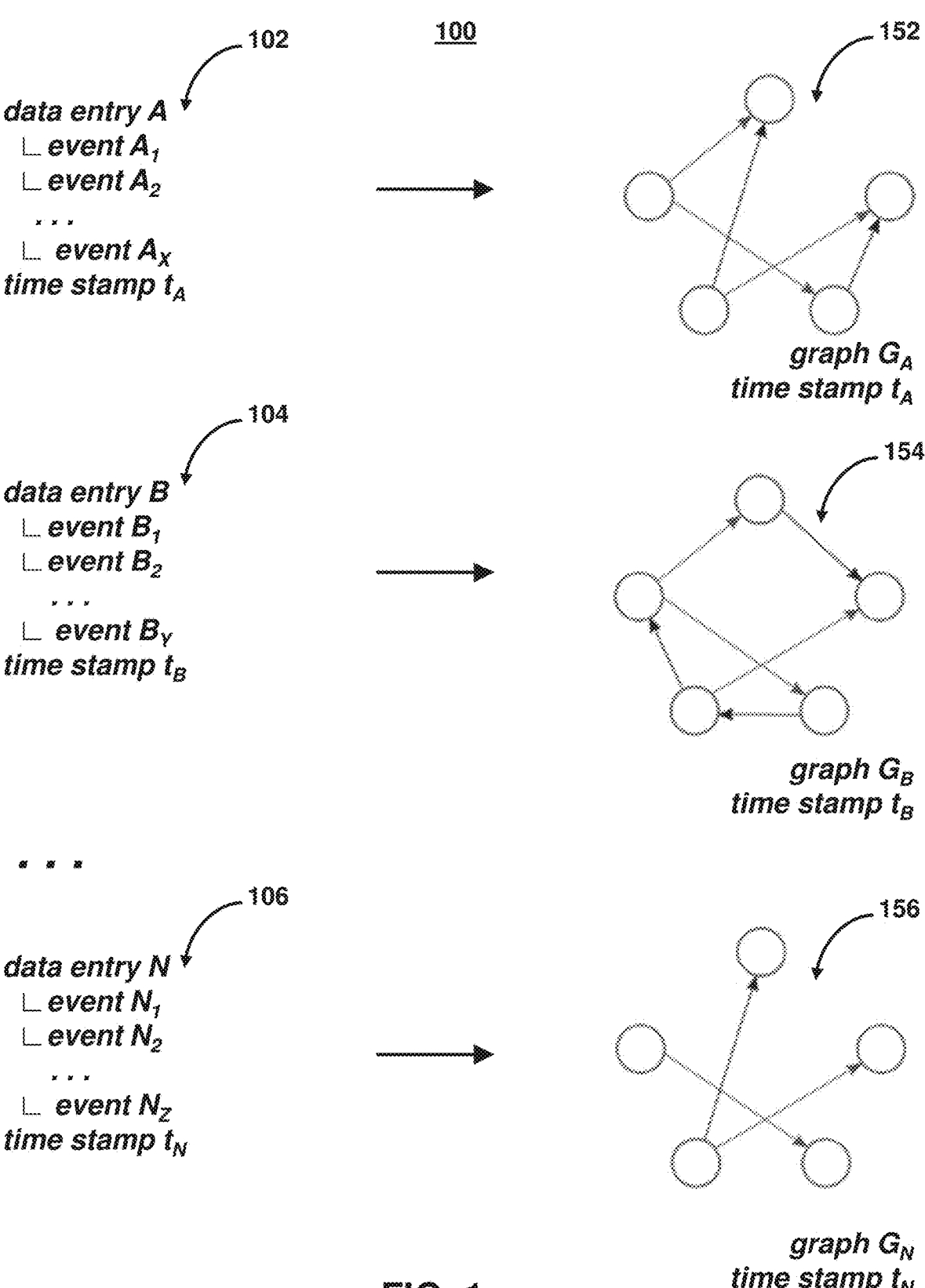
FIG. 1 shows an illustrative diagram for tabular data and corresponding time stamped graphs used to predict from tabular data one or more features indicative of a difference between two different populations, in accordance with one or more embodiments.

FIG. 1 shows an illustrative diagram 100 for tabular data and corresponding time stamped graphs used for predicting from tabular data one or more features indicative of a difference between two different populations, in accordance with one or more embodiments. For example, FIG. 1 illustrates a time stamped graph that represents events associated with a time stamp and is independent of any events before or after the associated time stamp. Therefore, the events represented in a given graph do not overlap with the events represented in another graph. This is because each graph represents a snapshot of events occurring during a suitable period of time represented by the time stamp associated with the graph. Conventional systems for analyzing tabular data to predict such features looked at each row or data entry independently, while the system may use the graph-based approach that leverages relationships across rows to predict relevant features.

In some embodiments, the time stamped tabular data that is received may include data entries A, B, . . . , N and associated time stamps $t_A$, $t_B$, . . . , $t_N$. This time stamped tabular data may be considered to represent a time series where a series of events are indexed in order by the associated time stamps. For example. FIG. 1 shows data entries 102, 104, and 106 (corresponding to data entries A, B, and N). In some embodiments, the data entries and associated time stamps may be received separately (e.g., from different sources, or in different files, etc.). In some embodiments, the data entries and associated time stamps may be received together (e.g., from the same source, or in the same file, etc.).

Data entry A includes information regarding events $A_1$, $A_2$, . . . , $A_X$ associated with time stamp $t_A$. For example, events $A_1$, $A_2$, . . . , $A_X$ may represent X transactions (or another suitable event) occurring on a particular day or hour (or another suitable period of time) represented by time stamp $t_A$. Similarly, data entry B includes information regarding events $B_1$, $B_2$, . . . , $B_Y$ associated with time stamp $t_B$. For example, events $B_1$, $B_2$, . . . , $B_Y$ may represent Y transactions (or another suitable event) occurring on a particular day (or another suitable period of time) represented by time stamp $t_B$. The events from data entry A do not overlap with the events from data entry B. This is because each data entry represents a snapshot of events occurring during a suitable period of time represented by the time stamp associated with the data entry. Therefore, events from data entry A occurred during a period of time represented by time stamp $t_A$, while events from data entry B occurred during a period of time represented by time stamp $t_B$.

Similarly, data entry N includes information regarding events $N_1$, $N_2$, . . . , $N_Z$ associated with time stamp $t_N$. For example, events $N_1$, $N_2$, . . . , $N_Z$ may represent Z transactions (or another suitable event) occurring on a particular day (or another suitable period of time) represented by time stamp $t_N$. The number of events represented by each data entry may vary and any such variations should be considered within the scope and spirit of this disclosure. The events from data entry N do not overlap with the events from data entry A or data entry B. This is because each data entry represents a snapshot of events occurring during a suitable period of time represented by the time stamp associated with the data entry. Therefore, events from data entry N occurred during a period of time represented by time stamp $t_N$, while events from data entry A and data entry B occurred during periods of time represented by time stamp $t_A$ and time stamp $t_B$, respectively.

In some embodiments, each data entry (or row or another suitable portion) of the time stamped tabular data is converted into a corresponding graph representation. For example, for a given data entry, one or more events and the entities involved may be identified. The corresponding graph representation or graph for the data entry, also referred to herein as a "time stamped graph," may include the entities as nodes and the events involving the entities may be indicated via edges connecting the appropriate nodes. For example. FIG. 1 shows data entries 102, 104, and 106 (corresponding to data entries A, B, and N) and associated time stamped graphs 152, 154, and 156 (corresponding to graphs $G_A$, $G_B$, and $G_N$). In some embodiments, the data entries and associated time stamped graphs may be received separately (e.g., from different sources, or in different files, etc.). In some embodiments, the data entries and associated time stamped graphs may be received together (e.g., from the same source, or in the same file, etc.). In some embodiments, the data entries may be received, and the associated time stamped graphs may be subsequently generated. In some embodiments, the data entries may be received at a remote location, the associated time stamped graphs may be generated at the remote location, and only the time stamped graphs may be received from the remote location.

Graph $G_A$ includes nodes and edges representing events from data entry A. For example, the events $A_1$, $A_2$, . . . , $A_X$ may represent X transactions (or another suitable event) between multiple entities occurring on a particular day or hour (or another suitable period of time) represented by time stamp $t_A$, and in graph $G_A$, each node may represent an entity, and each edge may represent a transaction between the nodes connected by the edge occurring on a particular day or hour (or another suitable period of time) represented by time stamp $t_A$. Similarly, graph $G_B$ includes nodes and edges representing events from data entry B. For example, the events $B_1, B_2, \ldots, B_Y$ may represent Y transactions (or another suitable event) between multiple entities occurring on a particular day or hour (or another suitable period of time) represented by time stamp $t_A$, and in graph $G_B$, each node may represent an entity, and each edge may represent a transaction between the nodes connected by the edge occurring on a particular day or hour (or another suitable period of time) represented by time stamp $t_B$. It is noted that because each time stamped graph represents events associated with a time stamp, the time stamped graph is independent of any events before or after the associated time stamp. As discussed above, the events represented in graph $G_A$ do not overlap with the events represented in graph $G_B$. This is because each graph represents a snapshot of events occurring during a suitable period of time represented by the time stamp associated with the graph. The entities represented in graph $G_A$ however may or may not overlap with the entities represented in graph $G_B$. This is because the same or a subset of the entities may be involved in the different events represented by graph $G_A$ and graph $G_B$.

Similarly, graph $G_N$ includes nodes and edges representing events from data entry N. For example, the events $N_1$, $N_2, \ldots, N_Z$ may represent Z transactions (or another suitable event) between multiple entities occurring on a particular day or hour (or another suitable period of time) represented by time stamp $t_N$, and in graph $G_N$, each node may represent an entity, and each edge may represent a transaction between the nodes connected by the edge occurring on a particular day or hour (or another suitable period of time) represented by time stamp $t_N$. It is noted that because each time stamped graph represents events associated with a time stamp, the time stamped graph is independent of any events before or after the associated time stamp. As discussed above, the events represented in graph $G_N$ do not overlap with the events represented in graph $G_A$ or graph $G_B$. This is because each graph represents a snapshot of events occurring during a suitable period of time represented by the time stamp associated with the graph. The entities represented in graph $G_N$ however may or may not overlap with the entities represented in graph $G_A$ or graph $G_B$. This is because the same or a subset of the entities may be involved in the different events represented by graph $G_N$, graph $G_A$, and graph $G_B$.

In some embodiments, each time stamped graph may be converted into a set of graph embeddings suitable for applying one or more machine learning techniques. As referred to herein, graph embeddings may include information regarding graph topology, node-to-node relationship, and other relevant information about graphs, subgraphs, and nodes. In one example, each node may be encoded with its own vector representation using techniques such as Deep-Walk, node2vec, SDNE, etc. This embedding may be used to perform visualization or prediction on the node level, e.g., visualization of nodes in the 2D plane, or prediction of new connections based on node similarities. In another example, the whole graph may be represented with a single vector using techniques such as graph2vec, etc. Those embeddings may be used to make predictions on the graph level and to compare or visualize the whole graphs. While graphs are a meaningful and understandable representation of data, graph embeddings may be more suitable for applying machine learning techniques. Machine learning on graphs is limited. Because graphs consist of edges and nodes, those network relationships can only use a specific subset of mathematics, statistics, and machine learning. On the other hand, vector spaces have a richer toolset of approaches. Further, graph embeddings are compressed representations and can pack node properties in a vector with a smaller dimension. As a result, vector operations are simpler and faster than comparable operations on graphs.

As referred to herein, a "population" may include a set of entities, such as a set of people, systems, products, services, predictions, etc. In some embodiments, the population may include a set of entities corresponding to a particular time period. In some embodiments, the population may include a set of entities corresponding to a particular geographical location. In some embodiments, the population may include a set of entities corresponding to a particular model, such as training data or predictions from the model.

As referred to herein, a "data entry" may include a row, a column, or another suitable portion of tabular data for a population. For example, the data entry may include information regarding a transaction or another suitable event between one or more entities from the population.

As referred to herein, a "feature" may include information present in a data entry for a population. For example, the feature may be indicative of a difference between two different populations.

In some embodiments, the system may highlight differences between two separate populations via a graph-based approach such that it exploits graph embeddings to identify and amplify attributes and features that make them differ. The populations may be from two different market segments, about two different products or services, at two different times, or between a model prediction and actual data, etc. For example, the system may capture changes in trends or differences in populations. The system may train one or more machine learning models to detect the change between corresponding entities in two different populations. The system may generate graph embeddings for input to the machine learning model in order to predict one or more features that drive the difference between the two populations.

The described systems and methods address the technical problem of how to predict from tabular data one or more features driving the differences between data from two different populations. Such tabular data is typically sparse and includes few samples available for training. For example, the tabular data may include information regarding activity of bank accounts but may include very few instances of activity for a bank account for a particular customer. The solution to this technical problem, in some embodiments, includes generating graph embeddings from the tabular data for both populations and processing the graph embeddings using a machine learning model to predict one or more features driving the difference between the two populations. Solving this technical problem provides the practical benefit of accurately predicting from tabular data one or more features driving the differences between two populations. Conventional systems for analyzing tabular data to predict such features looked at each row or data entry independently, while the graph-based approach leverages relationships across rows to predict relevant features. Conventional systems did not contemplate graphing time stamped tabular data and converting the subsequent graphs to sets of graph embeddings per time stamp for analysis.

Figure 2A:
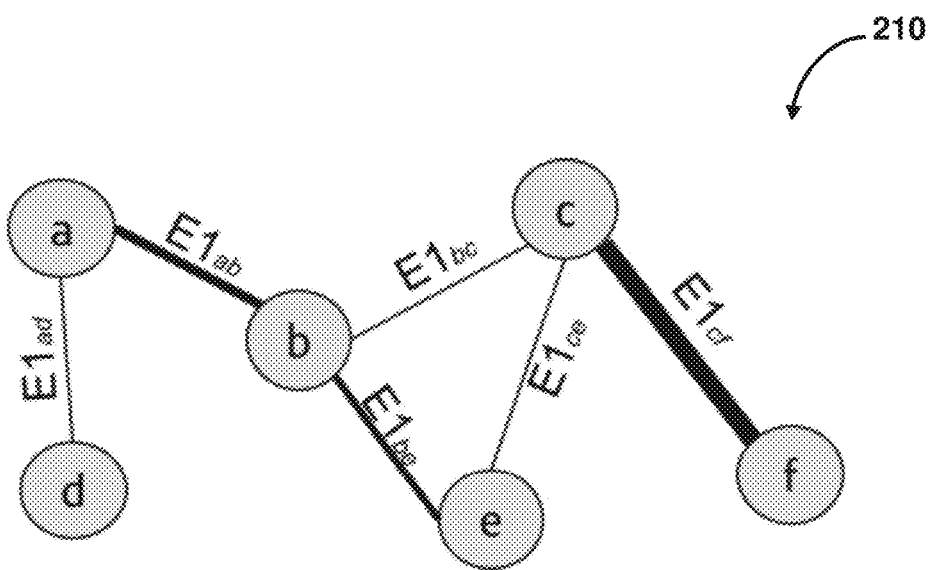
FIG. 2A shows an illustrative diagram for time stamped graphs generated based on data entries from tabular data for two different populations, in accordance with one or more embodiments.
Figure 2A:
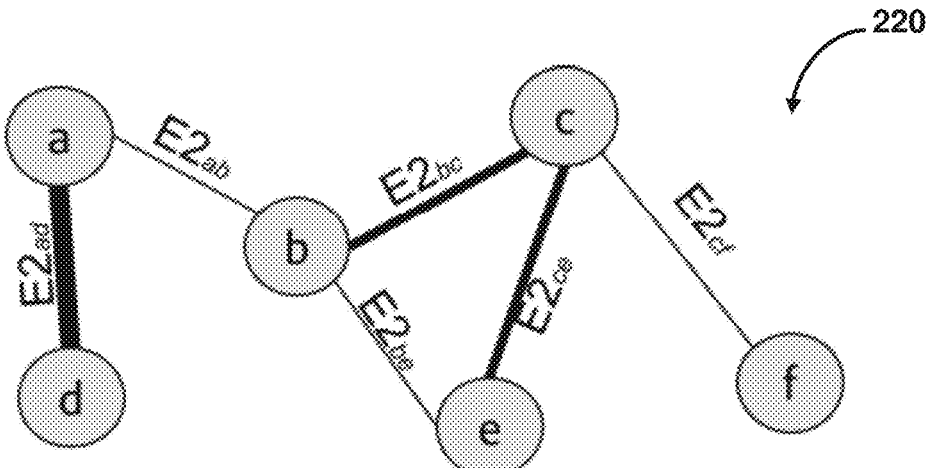

FIG. 2A shows an illustrative diagram 200 for time stamped graphs (such as those described with respect to FIG.

1) generated based on data entries from tabular data for two different populations, in accordance with one or more embodiments. The system may receive in tabular form data entries for Population 1 and data entries for Population 2. For example. Population 1 may be representative of a population at Time 1, and Population 2 may be representative of the same population at Time 2. In another example, Population 1 may relate to Geographical Location 1, and Population 2 may relate to Geographical Location 2. In yet another example. Population 1 may be representative of source data used to train a model, and Population 2 may be representative of predictive data generated using the model.

A data entry of the data entries for Population 1 may include values for one or more features. Similarly, a data entry of the data entries for Population 2 may include values for those features as well. The system may generate a graph 210 based on the data entry from Population 1 and a graph 220 based on the data entry from Population 2. The graph 210 includes edges a, b, c, d, e, and f and associated edges $E1_{ab}$, $E1_{bc}$, $E1_{ef}$, $E1_{ad}$, $E1_{be}$, and $E1_{ce}$. The graph 220 includes edges a, b, c, d, e, and f and associated edges $E2_{ab}$, $E2_{bc}$, $E2_{cf}$, $E2_{ad}$, $E2_{be}$, and $E2_{ce}$. It is noted that the graph 210 is independent of any events before or after its associated time stamp. Similarly, the graph 220 is independent of any events before or after its associated time stamp, which is different from the time stamp associated with the graph 210.

The system may determine that a node in the graph 210 corresponds to a node in the graph 220. For example, node "a" in the graph 210 may correspond to node "a" in the graph 220. In response to determining that the nodes correspond to each other, the system may generate a set of graph embeddings based on the graph 210 and a set of graph embeddings based on the graph 220. The system may use a machine learning model to process the sets of graph embeddings to identify at least one feature with a probability satisfying a threshold to be indicative of a difference between Population 1 and the Population 2. The machine learning model may include an Euclidean distance based model, a naive Bayesian model, an encoder-decoder model, or another suitable machine learning model. By doing so, the system may accurately predict from tabular data one or more features driving the differences between the two populations.

Figure 2B:
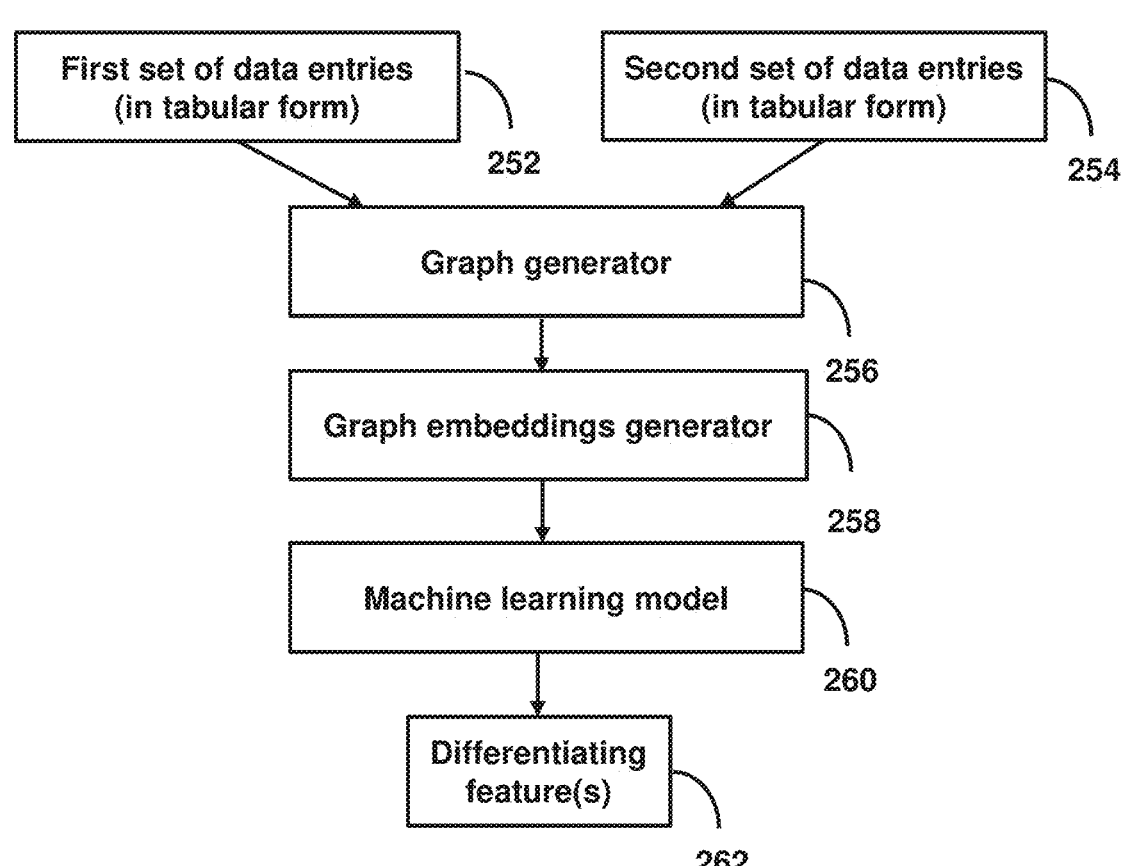
FIG. 2B shows an illustrative diagram for predicting from tabular data one or more features indicative of a difference between two different populations, in accordance with one or more embodiments.

FIG. 2B shows an illustrative diagram 250 for predicting from tabular data one or more features indicative of a difference between two different populations, in accordance with one or more embodiments. The system may receive in tabular form a first set of data entries 252 (e.g., data entries for Population 1) and a second set of data entries 254 (e.g., data entries for Population 2). A data entry of the data entries for Population 1 may include values for one or more features. Similarly, a data entry of the data entries for Population 2 may include values for those features as well. The system may provide the data entry from Population 1 to a graph generator 256 (e.g., implemented using one or more components described with respect to FIG. 3) to generate a graph (e.g., graph 210). The system may provide the data entry from Population 2 to the graph generator 256 to generate a graph (e.g., graph 220). It is noted that the graph 210 is independent of any events before or after its associated time stamp. Similarly, the graph 220 is independent of any events before or after its associated time stamp, which is different from the time stamp associated with the graph 210.

The system may determine that a node in the graph 210 corresponds to a node in the graph 220. In response to determining that the nodes correspond to each other, the system may provide the graph 210 to graph embeddings generator 258 (e.g., implemented using one or more components described with respect to FIG. 3) to generate a set of graph embeddings based on the graph 210. The system may provide the graph 220 to graph embeddings generator 258 to generate a set of graph embeddings based on the graph 220. The system may provide the sets of graph embeddings to a machine learning model 260 (e.g., implemented using one or more components described with respect to FIG. 3) to process the sets of graph embeddings to identify at least one feature 262 with a probability satisfying a threshold to be indicative of a difference between Population 1 and the Population 2. The machine learning model may include an Euclidean distance based model, a naive Bayesian model, an encoder-decoder model, or another suitable machine learning model. By doing so, the system may accurately predict from tabular data one or more features driving the differences between the two populations.

Figure 3:
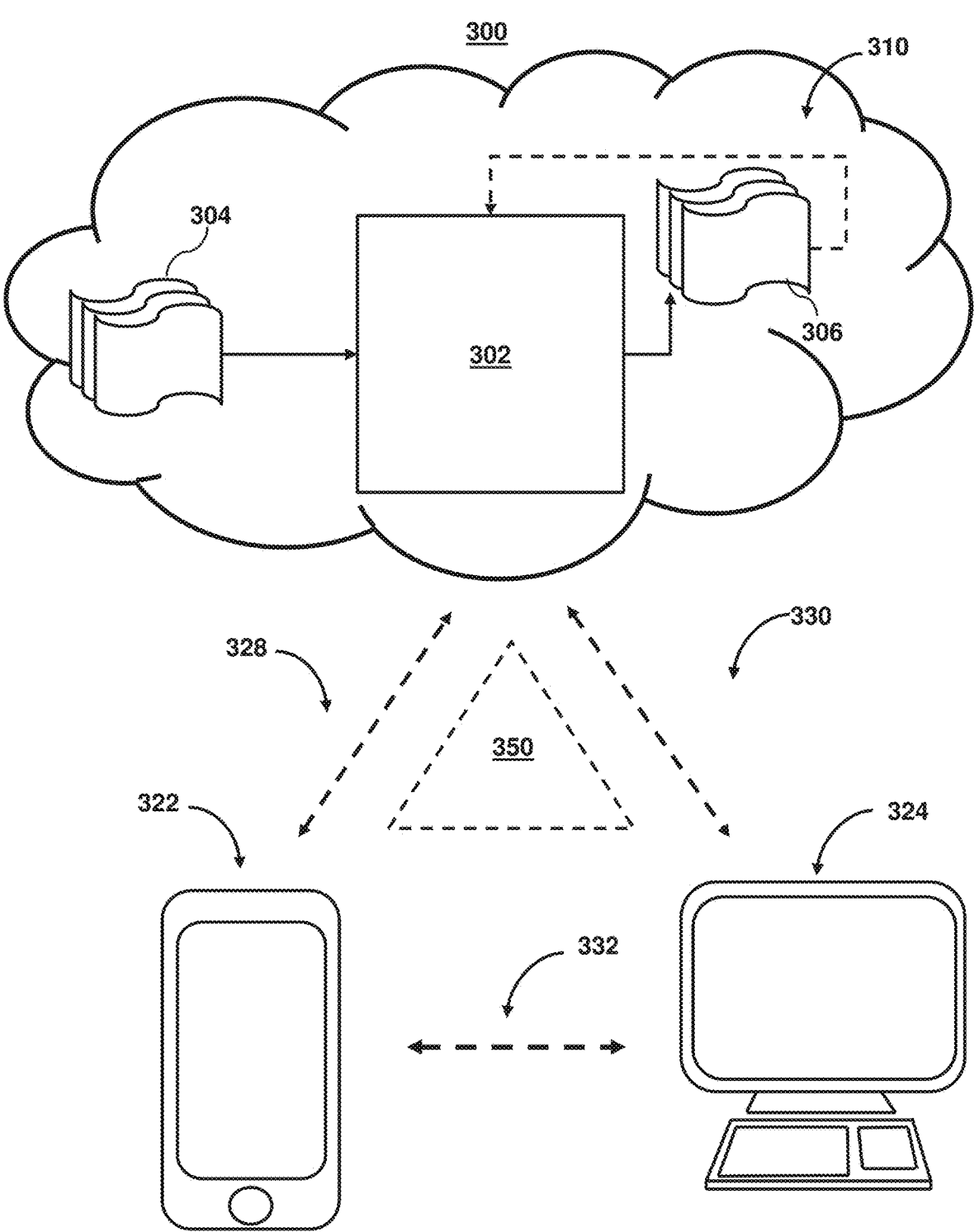
FIG. 3 shows illustrative components for a system used to predict from tabular data one or more features indicative of a difference between two different populations, in accordance with one or more embodiments.

FIG. 3 shows illustrative components for a system used to predict from tabular data one or more features indicative of a difference between two different populations, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include components for generating time stamped graphs, graph embeddings, and a machine learning model for predicting from tabular data one or more features indicative of a difference between two different populations. Cloud components 310 may access data entries from tabular data for two different populations in order to generate corresponding time stamped graphs. Cloud components 310 may include model 302, which may be a machine learning model, artificial intelligence model, etc. (which may be referred collectively as "models" herein).

Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., one or more features indicative of a difference between two different populations).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., one or more features indicative of a difference between two different populations).

In some embodiments, the model (e.g., model 302) may automatically perform actions based on outputs 306. In some embodiments, the model (e.g., model 302) may not perform any actions. The output of the model (e.g., model 302) may be used to predict one or more features indicative of a difference between two different populations.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby. Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

FIG. 4 shows a flowchart of the steps involved in predicting from tabular data one or more features indicative of a difference between two different populations, in accordance with one or more embodiments. For example, the system may use process 400 (e.g., as implemented on one or more system components described above) in order to predict from tabular data one or more features indicative of a difference between two different populations.

At step 402, process 400 (e.g., using one or more components described above) receives a plurality of first data entries and a plurality of second data entries.

In some embodiments, the plurality of first data entries corresponds to a first population, and wherein the plurality of second data entries corresponds to a second population. For example, the system may receive in tabular form data entries for a first population (e.g., Population 1 in FIG. 2A) and data entries for a second population (e.g., Population 2 in FIG. 2A).

In some embodiments, the first population is representative of a population at a first time, and the second population is representative of the population at a second time. For example, a first population (e.g., Population 1 in FIG. 2A) may be representative of a population at a first time (e.g., Time 1), and a second population (e.g., Population 2 in FIG. 2A) may be representative of the same population at a second time (e.g., Time 2).

In some embodiments, the first population is related to a first geographical location, and the second population is related to a second geographical location. For example, a first population (e.g., Population 1 in FIG. 2A) may relate to a first geographical location (e.g., Geographical Location 1), and (e.g., Population 2 in FIG. 2A) may relate to a second geographical location (e.g., Geographical Location 2).

In some embodiments, the plurality of first data entries is representative of source data used to train a model, and the plurality of second data entries is representative of predictive data generated using the model. For example, (e.g., Population 1 in FIG. 2A) may be representative of source data used to train a model, and (e.g., Population 2 in FIG. 2A) may be representative of predictive data generated using the model.

At step 404, process 400 generates a first graph based on a first data entry of the plurality of first data entries and a second graph based on a second data entry of the plurality of second data entries. In some embodiments, the first data entry comprises first values for one or more features, and wherein the second data entry comprises second values for the one or more features. For example, a data entry of the data entries for Population 1 may include values for one or more features. In this example, a data entry of the data entries for Population 2 may include values for those features as well.

At step 406, process 400 determines that a first node in the first graph corresponds to a second node in the second graph. In some embodiments, the first graph is independent of any events before or after a first time stamp, the second graph is independent of any events before or after a second time stamp, and determining that a first node in the first graph corresponds to a second node in the second graph comprises determining that the first node in the first graph associated with the first time stamp corresponds to the second node in the second graph associated with the second time stamp. For example, the system may determine that a node in the first graph (e.g., graph 210 in FIG. 2A) corresponds to a node in the second graph (e.g., graph 220 in FIG. 2A).

At step 408, in response to determining that the first node corresponds to the second node, process 400 generates a first set of graph embeddings based on the first graph and a second set of graph embeddings based on the second graph. For example, in response to determining that the nodes correspond to each other, the system may generate a set of graph embeddings based on the first graph (e.g., graph 210 in FIG. 2A) and a set of graph embeddings based on the second graph (e.g., graph 220 in FIG. 2A). The graph embeddings may capture information regarding graph topology, node-to-node relationship, and other relevant information about graphs, subgraphs, and nodes. While graphs are a meaningful and understandable representation of data, graph embeddings may be more suitable for applying machine learning techniques. Machine learning on graphs is limited. Because graphs consist of edges and nodes, those network relationships can only use a specific subset of mathematics, statistics, and machine learning. On the other hand, vector spaces have a richer toolset of approaches. Further, graph embeddings are compressed representations and can pack node properties in a vector with a smaller dimension. As a result, vector operations are simpler and faster than comparable operations on graphs.

At step 410, process 400 processes, using a machine learning model, the first set of graph embeddings and the second set of graph embeddings to identify at least one feature common to the first data entry and the second data entry and indicative of a difference between the plurality of first data entries and the plurality of second data entries. In some embodiments, the machine learning model comprises an Euclidean distance based model, a naive Bayesian model, or an encoder-decoder model. By doing so, the system may identify from the one or more features at least one feature with a probability satisfying a threshold to be indicative of a difference between two different populations.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving in tabular form a plurality of first data entries for a first population and a plurality of second data entries for a second population, wherein: a first data entry of the plurality of first data entries comprises first values for one or more features; and a second data entry of the plurality of second data entries comprises second values for the one or more features; generating a first graph based on the first data entry and a second graph based on the second data entry, wherein: the first graph is independent of any events before or after a first time stamp; and the second graph is independent of any events before or after a second time stamp; determining that a first node in the first graph associated with the first time stamp corresponds to a second node in the second graph associated with the second time stamp; in response to determining that the first node corresponds to the second node, generating a first set of graph embeddings based on the first graph and a second set of graph embeddings based on the second graph; and processing, using a machine learning model, the first set of graph embeddings and the second set of graph embeddings to identify, from the one or more features, at least one feature with a probability satisfying a threshold to be indicative of a difference between the first population and the second population.

2. A method, the method comprising: receiving a plurality of first data entries and a plurality of second data entries; generating a first graph based on a first data entry of the plurality of first data entries and a second graph based on a second data entry of the plurality of second data entries; determining that a first node in the first graph corresponds to a second node in the second graph; in response to determining that the first node corresponds to the second node, generating a first set of graph embeddings based on the first graph and a second set of graph embeddings based on the second graph; and processing, using a machine learning model, the first set of graph embeddings and the second set of graph embeddings to identify at least one feature common to the first data entry and the second data entry and indicative of a difference between the plurality of first data entries and the plurality of second data entries.

3. The method of any one of the preceding embodiments, wherein the plurality of first data entries corresponds to a first population, and wherein the plurality of second data entries corresponds to a second population.

4. The method of any one of the preceding embodiments, wherein the first population is representative of a population at a first time, and wherein the second population is representative of the population at a second time.

5. The method of any one of the preceding embodiments, wherein the first population is related to a first geographical location, and wherein the second population is related to a second geographical location.

6. The method of any one of the preceding embodiments, wherein the plurality of first data entries is representative of source data used to train a model, and wherein the plurality of second data entries is representative of predictive data generated using the model.

7. The method of any one of the preceding embodiments, wherein the machine learning model comprises an Euclidean distance based model, a naive Bayesian model, or an encoder-decoder model.

8. The method of any one of the preceding embodiments, wherein the first data entry comprises first values for one or more features, and wherein the second data entry comprises second values for the one or more features.

9. The method of any one of the preceding embodiments, wherein the first graph is independent of any events before or after a first time stamp, wherein the second graph is independent of any events before or after a second time stamp, and wherein determining that a first node in the first graph corresponds to a second node in the second graph comprises determining that the first node in the first graph associated with the first time stamp corresponds to the second node in the second graph associated with the second time stamp.

10. The method of any one of the preceding embodiments, wherein identifying the at least one feature comprises identifying the at least one feature from the one or more features.

11. A tangible, non-transitory, machine-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for predicting one or more features indicative of a difference between a first population and a second population, the system comprising:

one or more processors; and a non-transitory, computer-readable medium comprising instructions that, when executed by the one or more processors, cause operations comprising:

receiving in tabular form a plurality of first data entries for a first population and a plurality of second data entries for a second population, wherein:

a first data entry of the plurality of first data entries comprises first values for one or more features; and a second data entry of the plurality of second data entries comprises second values for the one or more features;

generating a first graph based on the first data entry and a second graph based on the second data entry, wherein:

the first graph is independent of any events before or after a first time stamp; and the second graph is independent of any events before or after a second time stamp;

determining that a first node in the first graph associated with the first time stamp corresponds to a second node in the second graph associated with the second time stamp;

generating, based on determining that the first node corresponds to the second node and for the first graph, a first set of graph embeddings that capture information regarding one or more of a graph topology of the first graph, node-to-node relationship of the first graph, or other information regarding subgraphs or nodes of the first graph;

generating, based on determining that the first node corresponds to the second node and for the second graph, a second set of graph embeddings that capture information regarding one or more of a graph topology of the second graph, node-to-node relationship of the second graph, or other information regarding subgraphs or nodes of the second graph; and processing, using a machine learning model, the first set of graph embeddings and the second set of graph embeddings to identify, from the one or more features, at least one feature with a probability satisfying a threshold to be indicative of a difference between the first population and the second population.

2. The system of claim 1, wherein the first population is representative of a population at a first time, and wherein the second population is representative of the population at a second time.

3. The system of claim 1, wherein the first population is related to a first geographical location, and wherein the second population is related to a second geographical location.

4. A method comprising:

receiving a plurality of first data entries and a plurality of second data entries;

generating a first graph based on a first data entry of the plurality of first data entries and a second graph based on a second data entry of the plurality of second data entries;

determining that a first node in the first graph corresponds to a second node in the second graph;

generating, based on determining that the first node corresponds to the second node and for the first graph, a first set of graph embeddings that capture information regarding one or more of a graph topology of the first graph, node-to-node relationship of the first graph, or other information regarding subgraphs or nodes of the first graph;

generating, based on determining that the first node corresponds to the second node and for the second graph, a second set of graph embeddings that capture information regarding one or more of a graph topology of the second graph, node-to-node relationship of the second graph, or other information regarding subgraphs or nodes of the second graph; and processing, using a machine learning model, the first set of graph embeddings and the second set of graph embeddings to identify at least one feature common to the first data entry and the second data entry and indicative of a difference between the plurality of first data entries and the plurality of second data entries.

5. The method of claim 4, wherein the plurality of first data entries corresponds to a first population, and wherein the plurality of second data entries corresponds to a second population.

6. The method of claim 5, wherein the first population is representative of a population at a first time, and wherein the second population is representative of the population at a second time.

7. The method of claim 5, wherein the first population is related to a first geographical location, and wherein the second population is related to a second geographical location.

8. The method of claim 4, wherein the plurality of first data entries is representative of source data used to train a model, and wherein the plurality of second data entries is representative of predictive data generated using the model.

9. The method of claim 4, wherein the machine learning model comprises an Euclidean distance based model, a naive Bayesian model, or an encoder-decoder model.

10. The method of claim 4, wherein the first data entry comprises first values for one or more features, and wherein the second data entry comprises second values for the one or more features.

11. The method of claim 10, wherein the first graph is independent of any events before or after a first time stamp, wherein the second graph is independent of any events before or after a second time stamp, and wherein determining that a first node in the first graph corresponds to a second node in the second graph comprises determining that the first node in the first graph associated with the first time stamp corresponds to the second node in the second graph associated with the second time stamp.

12. The method of claim 11, wherein identifying the at least one feature comprises identifying the at least one feature from the one or more features.

13. A non-transitory, computer-readable medium comprising instructions that, when executed by one or more processors, cause operations comprising:

receiving a plurality of first data entries and a plurality of second data entries;

generating a first graph based on a first data entry of the plurality of first data entries and a second graph based on a second data entry of the plurality of second data entries;

determining that a first node in the first graph corresponds to a second node in the second graph;

generating, based on determining that the first node corresponds to the second node and for the first graph, a first set of graph embeddings that capture information regarding one or more of a graph topology of the first graph, node-to-node relationship of the first graph, or other information regarding subgraphs or nodes of the first graph;

generating, based on determining that the first node corresponds to the second node and for the second graph, a second set of graph embeddings that capture information regarding one or more of a graph topology of the second graph, node-to-node relationship of the second graph, or other information regarding subgraphs or nodes of the second graph; and processing, using a machine learning model, the first set of graph embeddings and the second set of graph embeddings to identify at least one feature common to the first data entry and the second data entry and indicative of a difference between the plurality of first data entries and the plurality of second data entries.

14. The non-transitory, computer-readable medium of claim 13, wherein the plurality of first data entries corresponds to a first population, and wherein the plurality of second data entries corresponds to a second population.

15. The non-transitory, computer-readable medium of claim 14, wherein the first population is representative of a population at a first time, and wherein the second population is representative of the population at a second time.

16. The non-transitory, computer-readable medium of claim 14, wherein the first population is related to a first geographical location, and wherein the second population is related to a second geographical location.

17. The non-transitory, computer-readable medium of claim 13, wherein the plurality of first data entries is representative of source data used to train a model, and wherein the plurality of second data entries is representative of predictive data generated using the model.

18. The non-transitory, computer-readable medium of claim 13, wherein the machine learning model comprises an Euclidean distance based model, a naive Bayesian model, or an encoder-decoder model.

19. The non-transitory, computer-readable medium of claim 13, wherein the first data entry comprises first values for one or more features, and wherein the second data entry comprises second values for the one or more features.

20. The non-transitory, computer-readable medium of claim 19, the first graph is independent of any events before or after a first time stamp, wherein the second graph is independent of any events before or after a second time stamp, and wherein determining that a first node in the first graph corresponds to a second node in the second graph comprises determining that the first node in the first graph associated with the first time stamp corresponds to the second node in the second graph associated with the second time stamp.

21. The non-transitory, computer-readable medium of claim 20, wherein identifying the at least one feature comprises identifying the at least one feature from the one or more features.

\* \* \* \* \*